United States Patent US 8,410,971 B2
Friedlander
Apr. 2, 2013

(54) SYSTEM AND METHOD FOR CONFIGURING OPERATION OF A REMOTE CONTROL BY A DISPLAY DEVICE

(75) Inventor: Steven Friedlander, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 393 days.

(21) Appl. No.: 12/752,025

(22) Filed: Mar. 31, 2010

(65) Prior Publication Data
US 2011/0084867 A1 Apr. 14, 2011

Related U.S. Application Data
(60) Provisional application No. 61/251,074, filed on Oct. 13, 2009.

(51) Int. Cl.
H04L 17/12 (2006.01)
(52) U.S. Cl. ......... 341/176; 348/352; 348/725; 348/734
(58) Field of Classification Search .................. 348/725, 348/734, 352; 340/12–22, 426.13; 341/176
See application file for complete search history.

(56) References Cited

U.S. PATENT DOCUMENTS

| | | | |
|---|---|---|---|
| 7,170,422 B2 | 1/2007 | Nelson et al. | |
| 8,031,270 B1 * | 10/2011 | Wisniewski et al. | 348/734 |
| 8,068,184 B2 * | 11/2011 | Hicks | 348/734 |
| 8,098,337 B2 * | 1/2012 | Martch | 348/734 |
| 2005/0110651 A1 * | 5/2005 | Martis et al. | 340/825.69 |
| 2005/0155078 A1 * | 7/2005 | Imada et al. | 725/114 |
| 2006/0084409 A1 * | 4/2006 | Ghadiali | 455/352 |
| 2007/0296552 A1 * | 12/2007 | Huang et al. | 340/10.5 |
| 2008/0168504 A1 | 7/2008 | Yamada et al. | |
| 2010/0079680 A1 * | 4/2010 | White et al. | 348/734 |
| 2011/0157478 A1 * | 6/2011 | McRae et al. | 348/734 |
| 2012/0092564 A1 * | 4/2012 | Bae | 348/734 |

OTHER PUBLICATIONS

Chapter 12: Remote Control Systems, 2009, http://www.homw-theater.com/chap12theater.html.

* cited by examiner

Primary Examiner — Linh Nguyen
(74) Attorney, Agent, or Firm — Fitch, Even, Tabin & Flannery LLP

(57) ABSTRACT

System and methods are provided for configuring operation of a remote control by a display device. In one embodiment a method includes detecting user selection of an input of the display device and determining a command for the remote control based on the user selection of the input, wherein the command identifies a configuration for the remote control. The method further includes transmitting the command to the remote control, by the display device, for configuration of the remote control, wherein the configuration specifies operation of the remote control with one or more devices associated with the input.

24 Claims, 3 Drawing Sheets

SYSTEM AND METHOD FOR CONFIGURING OPERATION OF A REMOTE CONTROL BY A DISPLAY DEVICE

This application claims priority to U.S. Provisional Application No. 61/251,074 filed Oct. 13, 2009.

FIELD OF THE INVENTION

The present invention relates generally to configuring a remote control for operation with one or more devices.

BACKGROUND OF THE INVENTION

Many consumers own at least one device which may be operated by a remote control. A great number of these consumers typically use a separate remote control for each of their devices. This can result in remote control clutter and can even result in user difficulty in controlling multiple devices. A typical approach involves the use of programmable remote control. However, many users find programming and/or operation of universal controllers to be difficult. Further, many devices require transmission of commands based on manufacturer settings. For example, subscribers of satellite programming are typically required to utilize a subscriber provided set-top box which usually does not operate with the remote control provided by a manufacturer of a display device. One conventional solution is to provide a programmable remote control by a manufacturer, such as satellite provider, which may operate with one or more devices. Although configurable remote controls exist and may provide optical control for display devices other media devices, these devices typically do not provide more than one type of communication. Further, many users are deterred from programmable remote controls due to difficulty in programming and/or bulk associated with remote control packaging. Thus, users may still be required to retain one or more manufacturer remote controls for operation of their electronic devices. Further, these devices do not allow for configuration of the remote control by the display device.

Conventional remote controls can also be limited in their ability to provide user customization and flexibility of controller functions. Many existing "universal" remote controls are limited to operation with one device at a time. For example, these remote controls may be configured to transmit line of sight commands only. In some cases, these devices operate only one device at a time and thus, require a user to provide separate commands to each device. Further, the conventional devices do not allow for operation of a remote control based on activities of a user, such as viewing broadcast media or viewing recorded media. As a result, the conventional methods and devices do not provide users a desired flexibility for control of two or more devices. Additionally, the conventional methods do not allow for display devices to configure remote controls.

Thus, there is a desire to provide a programmable remote control which is easily programmed and allows for flexible configuration with one or more devices.

BRIEF SUMMARY OF THE INVENTION

Disclosed and claimed herein are a system and method for configuring operation of a remote control by a display device. In one embodiment, a method includes detecting user selection of an input of the display device, and determining a command for the remote control based on the user selection of the input, wherein the command identifies a configuration for the remote control. The method further includes transmitting the command to the remote control, by the display device, for configuration of the remote control, wherein the configuration specifies operation of the remote control with one or more devices associated with the input.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 2:
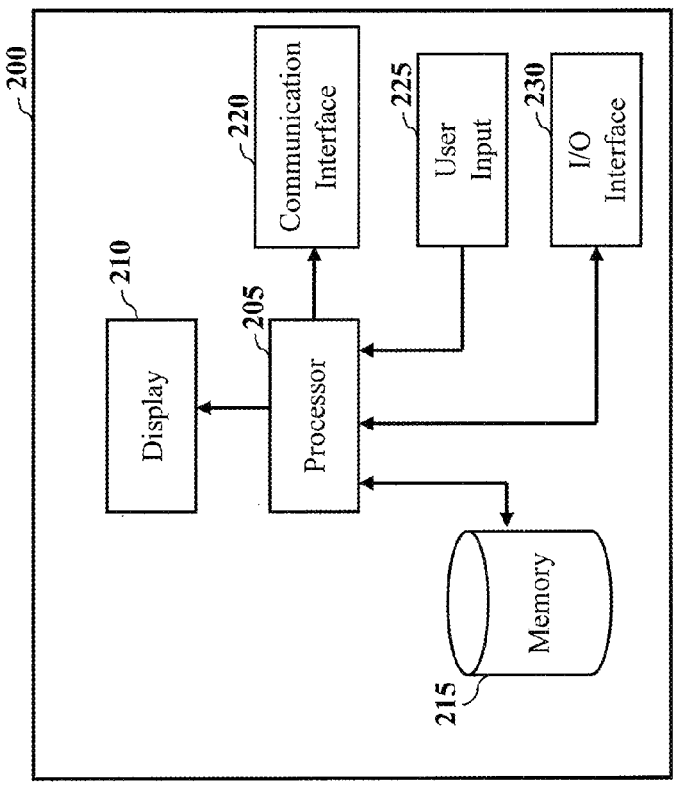
FIG. 2 depicts a simplified block diagram of the display device in FIG. 1 according to one embodiment.

One aspect of the present invention relates to simplifying operation of a remote control by providing commands to a remote control by a display device. In one embodiment, a display device is provided which may be configured to detect user selection of an input related to one or more devices coupled to the display device. The display device may be configured to transmit one or more commands for configuration of the remote control based on user selection of an input. In that fashion, operation of the remote control will not require the user to select devices prior to making selections on the remote control in certain instances.

In another embodiment, a process is provided for configuring operation of a remote control. The process may include transmitting a command to a remote control, wherein the command identifies a configuration for the remote control. The process may be initiated by user selection of one or more input modes and may further allow for automatic transmission of one or more commands to the display device. In one embodiment, the process may be configured to check if a configuration is required for a selected input. In another embodiment, the process may include receiving a current configuration from a remote control. The configuration file may be employed to determine whether a command should be transmitted to a remote control.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
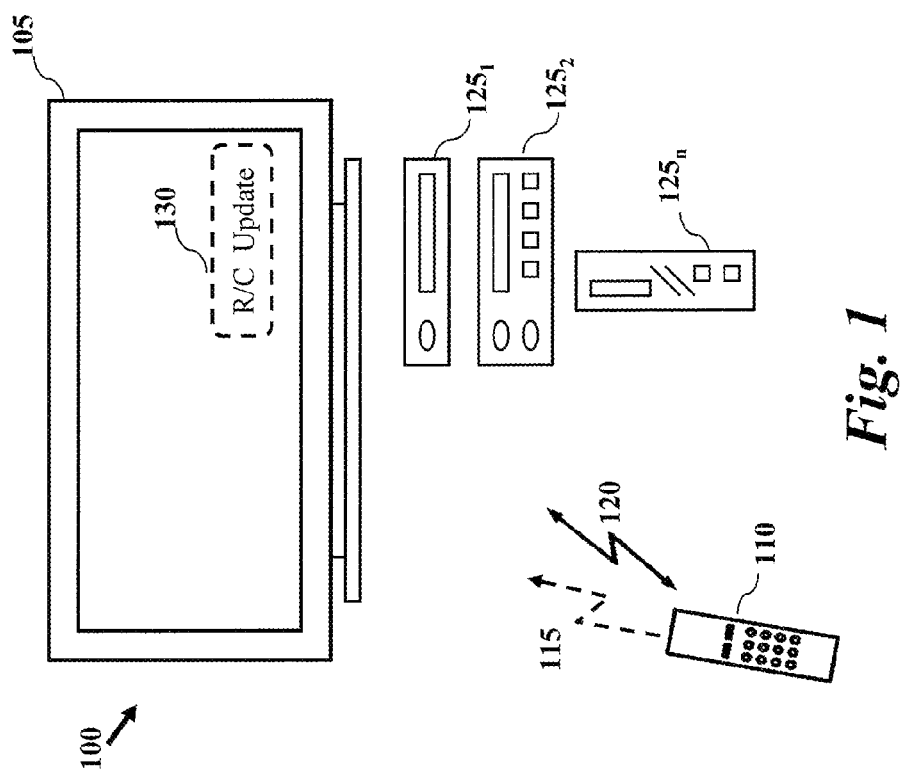
FIG. 1 depicts a graphical representation of a system according to one embodiment.

Referring now to the figures, FIG. 1 depicts a graphical representation of a system including a display device which may be configured to provide one or more commands to a remote control according to one embodiment of the invention. As depicted, system 100 includes display device 105 and remote control 110. Display device 105 may be configured to receive one or more wireless commands from remote control 110, shown as 115. By way of example, commands transmitted by remote control 110 and received by display device 105 may relate to commands for controlling power, volume adjustment, channel adjustment, source/input selection, navigation of menu and interface features of the display device 105, etc. According to one embodiment, remote control 110 may relate to a manufacturer remote associated with the manufacturer of the display device. In certain embodiments remote control 110 may relate to a universal, or programmable remote control.

According to another embodiment, remote control 110 may be configured to interoperate with display device 110 and one or more peripheral devices $125_{1-n}$. By way of example, remote control 110 may be configured to transmit one or more commands to set-top box $125_1$, media player $125_2$ (e.g., DVD™, Blu-Ray™, etc.) and gaming console 130. Although not depicted in FIG. 1, it should also be appreciated that remote control 110 may be configured to operate with other peripheral devices such as audio/video receiver, radio and media players in general.

As will be discussed in more detail below, one advantage of the invention may allow for programming of remote control 110 by display device 105 based on one or more commands generated by the display device. In that fashion, operation of a remote control may be simplified for a user in comparison to the conventional methods. According to another embodiment, display device 105 may be configured for wireless communication, shown as 120, with remote control 110 using one or more communication types. By way of example, display device 105 may be configured to transmit optical signals (e.g., IR signals) to provide line of sight communication with remote control 110. Display device 105 may be configured to transmit one or more commands in order to program the format and type of transmission based on a plurality of display device types and manufactures. In another embodiment, display device 105 may be configured for short range communication (e.g., radio frequency (RF), Bluetooth®, Wifi, etc.) with remote control 110.

According to another embodiment, display device 105 may be configured to receive a configuration profile from remote control 110. In that fashion, the display device may be able to determine whether a configuration change is required during user selection of an input mode. For example, a user selection identifying an input associated with the same devices as a previous input may not require a configuration change of the remote control.

Wireless communication by display device 105 may be associated with one or more inputs selected by a user or activity modes. As will be discussed in more detail below, display device 105 may include one or more inputs to receive data for display or output from peripheral devices $125_{1-n}$. According to another embodiment, display device 105 may be configured to display a message, shown as 130, when commands have been transmitted to remote control 110. For example, based on an update configuration of the remote control to operate a media player coupled to an input of display device 105, the display device may display a message such as RC update to indicate an update to the control functionality for the user. Further, one or more buttons of remote control 110 may now be configured to exclusively operate the media player and/or one of the plurality of devices.

Remote control 110 may further be configured to operate one or more devices without requiring the user to identify a device prior to selecting a command. For example, when a user selects an input associated with a disc player, display device 105 may be configured to transmit a command to configure the operation of one or more playback buttons (e.g., play, stop, advance, etc) to control the disc player. Additionally, buttons of remote control 110 associated with volume adjustment will control the display device.

Additionally, display device 105 and remote control 110 may be configured for short range communication, such as communication based on an 802.11 protocol. As such, remote control 110 may be configured to receive programming data for the remote control. Parameters and settings for communications with the one or more devices may be stored on remote control 105. Settings for communication by the display device may similarly be stored in memory. In one embodiment settings can provide for one or more IR formats, short range communication profiles (e.g., Bluetooth™ profiles) and network communication protocols. In an exemplary embodiment, display device 105 may be configured to store up to twenty communication settings.

Referring now to FIG. 2, a simplified block diagram is depicted of the display device of FIG. 1 according to one or more embodiments of the invention. As shown in FIG. 2, display device 200 (e.g., display device 105) includes processor 205, display 210, memory 215, communication interface 220, user input interface 225 and input/output (I/O) interface 230. Processor 205 may be configured to control operation of display device 200 based on one or more computer executable instructions stored in memory 215. Display 210 may be employed to display one or more of menu functions, an input mode, input modes available, current input mode of the display device, programming information, etc. Display 210 may further be configured to display data received from one or more devices (e.g., peripheral devices $125_{1-n}$).

Communication interface 220 may be configured to provide one or more communications services provided by the display device. In an exemplary embodiment, communication interface 220 may include one or more elements to allow for transmission of one or more of line of sight commands and non-line of sight communications. Communication interface 220 may be controlled by processor 205 for transmission and communication commands by display device 200. Although communication interface 220 is shown as a single element, it should be appreciated that display device 200 may include one or more elements for wireless communication. Further, communication interface 220 may include IR elements and RF components for infrared (IR) communication and radio frequency (RF) communication, respectively.

User input 225 of display device 200 may relate to one or more buttons (e.g., numerical keypad, volume control, channel control, menu controls), a pointing device (e.g., track ball), mode selection buttons, play back functionality (e.g., play, stop, pause, forward, reverse, slow motion, etc). In that fashion, a user of display device 200 can command one or more devices. Buttons of user input 225 may include hard and soft buttons, wherein functionality of the soft buttons may be based on an activity mode.

Figure 3:
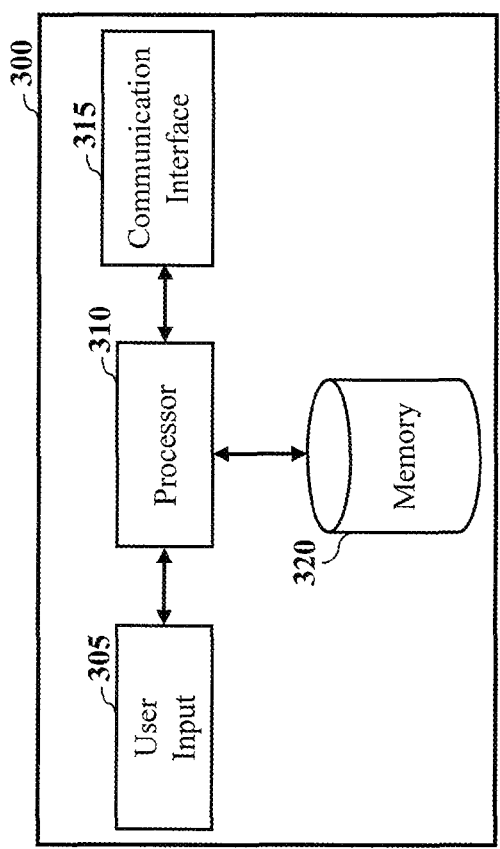
FIG. 3 depicts a simplified block diagram of the remote control in FIG. 1 according to one embodiment.

Referring now to FIG. 3, a simplified block diagram is depicted of the remote control of FIG. 1 according to one or more embodiments of the invention. As shown in FIG. 3, remote control 300 (e.g., remote control 110) includes user input 305, processor 310, communication interface 315, and memory 320. User input 305 relates to one or more buttons of the remote control and can include a numerical keypad, channel selector, volume adjustment, menu keys, input selection, etc. Processor 310 can configure the operation of one or more keys of user input 305, based on one or more commands received by remote control 300 via communication interface 315, to operate with one or more devices, such as a display device (e.g., display device 105). Accordingly, communication interface 315 of remote control may be configured to provide one or more of IR and RF communication with a display device and one or more peripheral devices based on a configured of the remote control. Remote control 300 may be configured by processor 310 and/or one or more instruction stored in memory 320. Memory 320 may further store communication codes and formats for communicating with one or more devices. According to one embodiment, the remote control 300 maybe configured to transmit a current configuration setting to the display device using communication interface 315.

Remote control 300 may be configured to include one or more activity modes, wherein the remote control may be configured for at least one type of wireless transmission based on selection of one or more buttons. In one embodiment, the remote control may be configured for communication base on infrared (IR) and radio frequency (RF) communication. In that fashion, the remote control may be specifically configured to operate a plurality of devices. Additionally, the input interface of the remote control may include one or more buttons and input devices to allow for interoperation with a plurality of devices and allow a user to provide data to one or more applications which are provided by a device. Accordingly, the present invention allows for a single device to control one or more devices while maintaining packaging of the remote control within an acceptable size.

According to one embodiment, remote control 300 may be programmed to operate with the one or more devices based on a configuration mode. In that fashion, buttons of remote control 300 may be employed by a user to operate the one or more devices.

Figure 4:
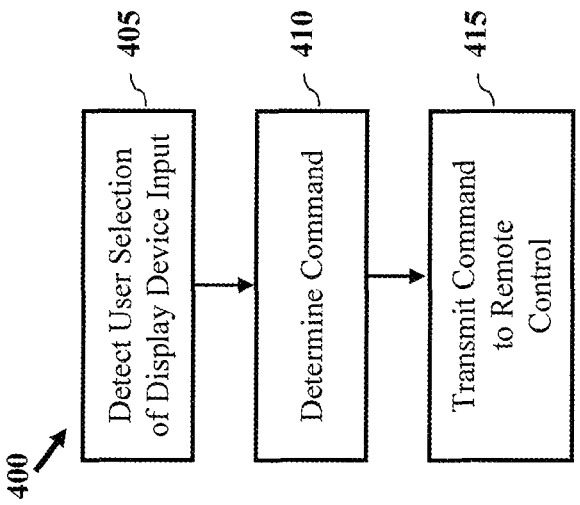
FIG. 4 depicts a process for configuring operation of a remote control according to one or more embodiments.

Referring now to FIG. 4, a process is depicted for configuring a remote control by a display device according to one or more embodiments. Process 400 may be initiated by detection of a user selection of a display device (e.g. display device 105) at block 405. For example, using one of a remote control and user interface of the display device, a user may select one or more input sources for the display device, including but not limited to a set-top box, disc player, media player, etc. An input may relate to a source of input data, such as an HDMI (High-Definition Multimedia Interface) terminal or based on the components coupled to the display device. Based on the user selection, operation of a remote control of the device may be adjusted to better suit the operators needs. The display device may then determine one or more configuration commands at block 410 based on the user selection. Commands may relate to one or more commands to program the operation of a remote control with one or more devices. A command may further be associated with a configuration identifying operation of remote control with one or more devices. The configuration may relate to adjusting or setting buttons of the remote control for operation with one or more devices associated with the input.

In certain embodiments, one or more commands determine at block 410 may be based on detecting devices coupled to an input terminal selected. For example, based on the devices detected, a command generated by the display device may be tailored to a particular device. Commands may similarly be based on modes. For example, one or more devices associated with an activity mode such, such as a home theater mode. According to another embodiment, commands may be based on detection of data on one or more inputs.

According to another embodiment, the display device may be configured to determine on or more commands based on a configuration profile received from the remote control. The remote control profile including one or more settings of the remote control.

The display device may then transmit to the remote control the determined commands at block 415. The commands transmitted may include codes to program the remote control, including specifying operation for one or more buttons and/or sets of buttons. The coded format of a command may be determined and utilized by the remote control to establish operation of the buttons. Programming of the remote based on a command may be based on preprogramming of the remote control with one or more devices coupled to the input.

Process 400 may further include displaying an operating change via a display screen (e.g., display 130). In certain embodiments, the display or an operating change may indicate that the control functions of the remote control have been modified. The display may relate to a text message and/or display of a symbol for a short period of time. In certain embodiments, the remote control may display a flash of light to indicate a change in operation based on a command from the display device.

Figure 5:
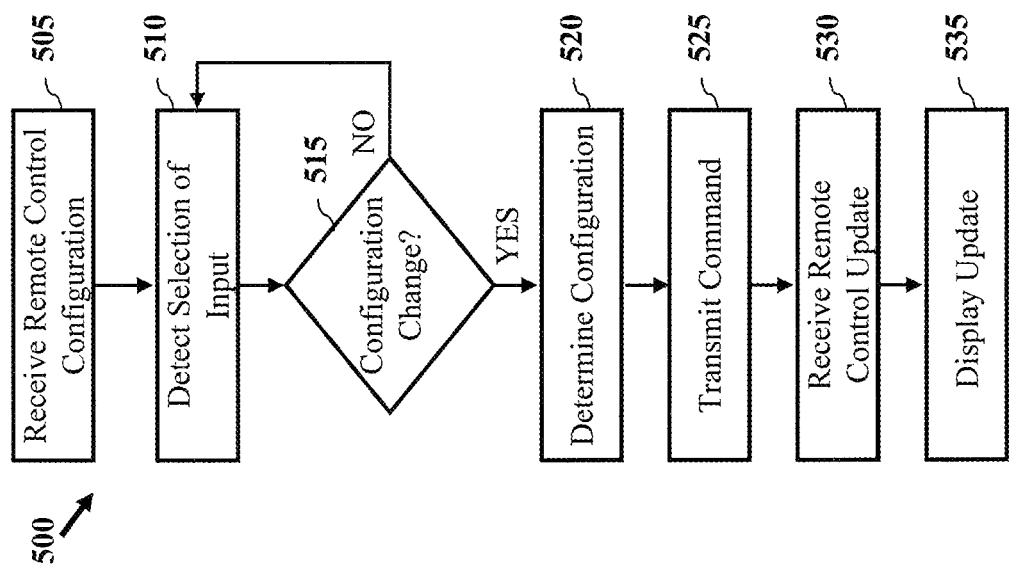
FIG. 5 depicts another process for configuring operation of a remote control according to one or more embodiments.

Referring now to FIG. 5, a process is depicted for configuring a remote control by a display device according to one or more embodiments. Process 500 may be initiated by a display device (e.g., display device 105) by receiving a remote control configuration at block 505. For example, a remote control configuration may be transmitted periodically by the remote control (e.g. remote control 110) to the display device. The display device can detect a user selection of an input at block

510. Based on the user selection, the display device may check if a configuration change is required for the remote control at decision block 515. Determination of a change by the display device may be based on the devices associated with the selected input. When the remote control does not require a configuration change ("NO" path out of decision block 515) the display device may await selection of a display device input at block 510. When the remote control does require a configuration change ("YES" path out of decision block 515) the display device may then determine s configuration required for the remote control at block 520. The display device may determine the configuration change based on the remote control configuration received at block 505 and one or more devices associated with the input. Based on the configuration, the display device may transmit a command to the remote control at block 525.

Process 500 may further include receiving a remote control update at block 530. In one embodiment, the remote control device may transmit a signal to the display device confirming receipt of the command and programming of the remote control. At block 535, the display device may display an update (e.g., message 130) based on a configuration change of the remote control.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for configuring operation of a remote control by a display device, the method comprising the acts of:
   detecting user selection of an input of the display device;
   determining a command for the remote control based on the user selection of the input, wherein the command identifies a configuration for the remote control; and
   transmitting the command to the remote control, by the display device, for configuration of the remote control, wherein the configuration specifies operation of the remote control with one or more devices associated with the input;
   wherein the user selection of the input of the display device comprises a user selection of an input terminal of the display device.

2. The method of claim 1, wherein user selection of an input relates to one or more of a remote control transmission, and a user selection of an interface of the display device to select an input.

3. The method of claim 1, wherein the input relates to an input data source coupled to the display device.

4. The method of claim 1, wherein determining a command includes detecting one or more devices coupled to the input terminal and determining a configuration change for the remote control.

5. The method of claim 1, wherein the configuration specifies operation of one or more buttons of the remote control.

6. The method of claim 1, wherein transmission of the command relates to transmission of a coded pattern as one of a radio frequency (RF) transmission, infrared (IR) transmission, short-range wireless communication, and wireless transmission in general.

7. The method of claim 1, further comprising receiving a configuration profile, by the display device, from the remote control and determining the command based on the configuration profile.

8. The method of claim 1, further comprising displaying a message, by the display device, to indicate a configuration change of the remote control.

9. A system comprising:
   a remote control; and
   a display device, the display device configured to:
      detect user selection of an input of the display device;
      determine a command for the remote control based on the user selection of the input, wherein the command identifies a configuration for the remote control; and
      transmit the command to the remote control, by the display device, for configuration of the remote control, wherein the configuration specifies operation of the remote control with one or more devices associated with the input
   wherein the user selection of the input of the display device comprises a user selection of an input terminal of the display device.

10. The system of claim 9, wherein user selection of an input relates to one or more of a remote control transmission, and a user selection of an interface of the display device to select an input.

11. The system of claim 9, wherein the input relates an input data source coupled to the display device.

12. The system of claim 9, wherein the display device is further configured to detect one or more devices coupled to the input terminal and determine a configuration change for the remote control to determine a command.

13. The system of claim 9, wherein the configuration specifies operation of one or more buttons of the remote control.

14. The system of claim 9, wherein transmission of a command by the display device relates to transmission of a coded pattern as one of a radio frequency (RF) transmission, infrared (IR) transmission, short-range wireless communication, and wireless transmission in general.

15. The system of claim 9, wherein the display device is further configured to receive a configuration profile from the remote control and determine the command based on the configuration profile.

16. The system of claim 9, wherein the display device is further configured to display a message to indicate a configuration change of the remote control.

17. A display device configured to configure operation of a remote control associated with the display device, the display device comprising:
   a processor configured to
      detect a user selection of an input of the display device, and
      determine a command for the remote control based on the user selection of the input, wherein the command identifies a configuration for the remote control; and
   a communications module configured to transmit the command to the remote control, by the display device, for configuration of the remote control,
   wherein the configuration specifies operation of the remote control with one or more devices associated with the input and
   wherein the user selection of the input of the display device comprises a user selection of an input terminal of the display device.

18. The display device of claim 17, wherein user selection of an input relates to one or more of a remote control transmission, and a user selection of an interface of the display device to select an input.

19. The display device of claim 17, wherein the input relates to an input data source coupled to the display.

20. The display device of claim 17, wherein the processor is further configured to detect one or more devices coupled to the input terminal and determine a configuration change for the remote control to determine a command.

21. The display device of claim 17, wherein the configuration specifies operation of one or more buttons of the remote control.

22. The display device of claim 17, wherein the communication module is further configured to transmit of a coded pattern as one of a radio frequency (RF) transmission, infrared (IR) transmission, short-range wireless communication, and wireless transmission in general, for transmission of the command.

23. The display device of claim 17, wherein the communication module is further configured to receive a configuration profile from the remote control and the processor is configured to determine the command based on the configuration profile.

24. The display device of claim 17, wherein the display devices comprises a display configured to displaying a message to indicate a configuration change of the remote control.

\* \* \* \* \*